Sept. 2, 1947.    C. LANGBERG    2,426,888
SLIDE VIEWING INSTRUMENT
Filed April 25, 1945    3 Sheets-Sheet 1

INVENTOR:
Charles Langberg
BY
Morrison, Kennedy & Campbell
ATTORNEYS.

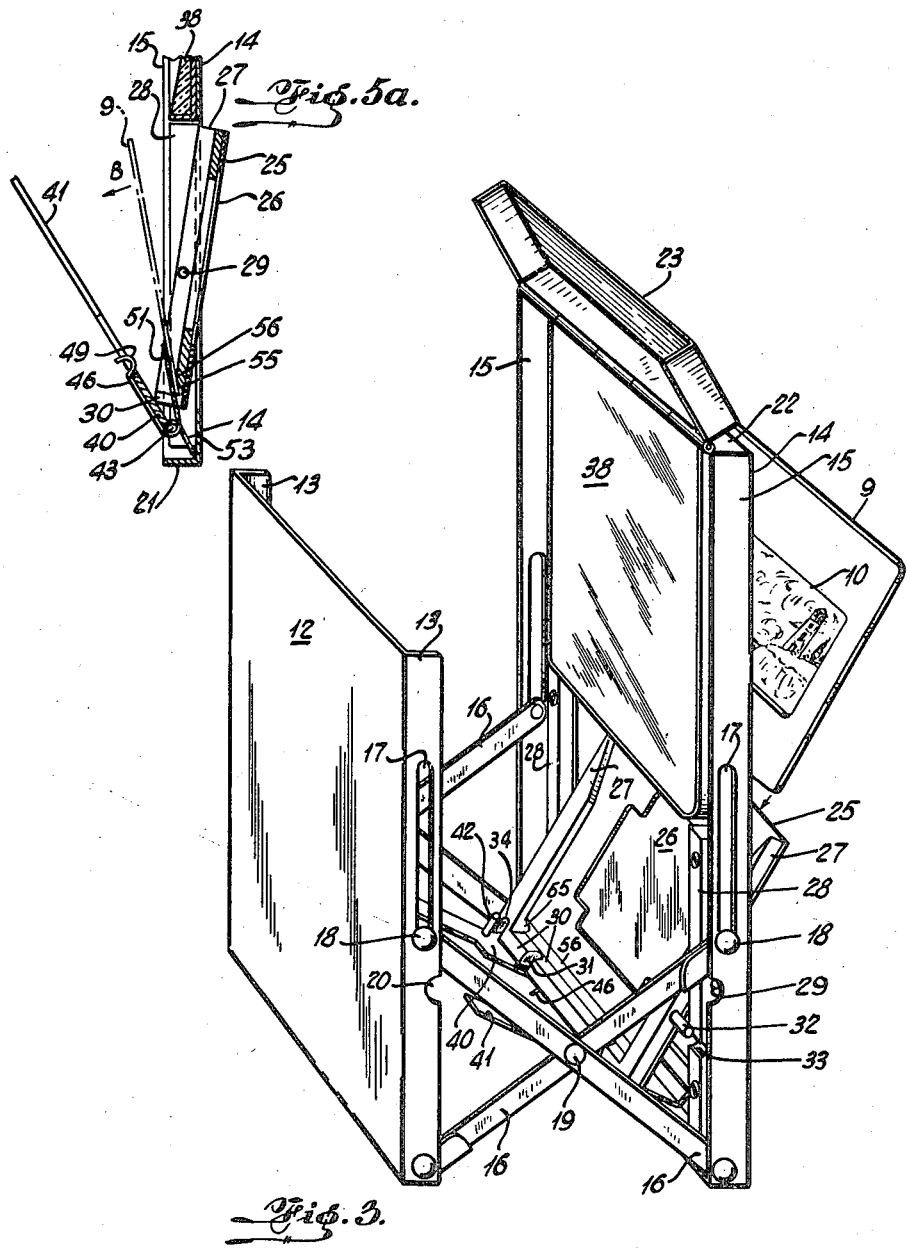

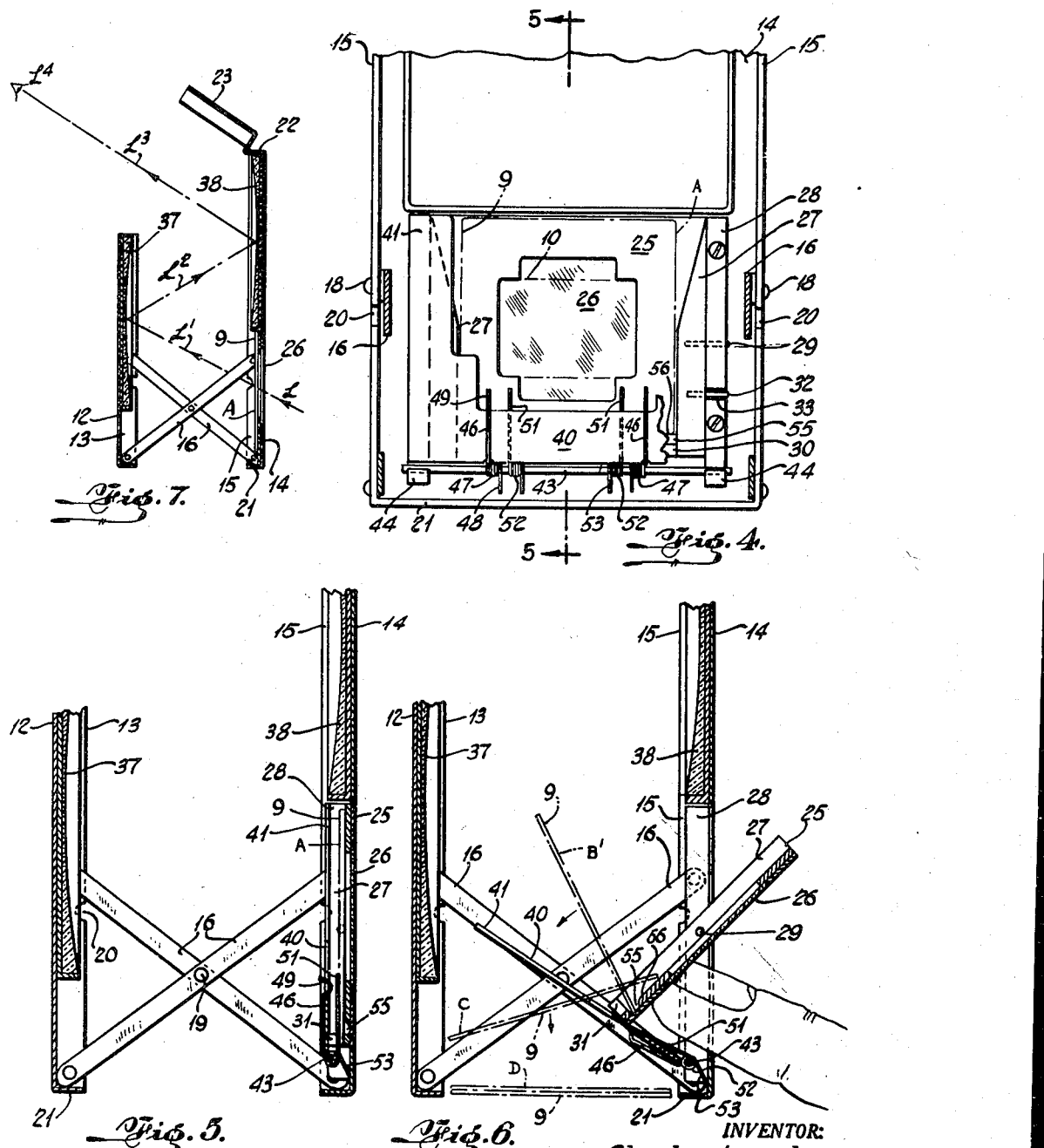

Patented Sept. 2, 1947

2,426,888

UNITED STATES PATENT OFFICE 2,426,888

SLIDE VIEWING INSTRUMENT

Charles Langberg, New York, N. Y., assignor to Optronics Laboratories, Inc., New York, N. Y., a corporation of New York Application April 25, 1945, Serial No. 590,147

7 Claims. (Cl. 88—74)

This invention is a novel slide viewing instrument, or optical device to facilitate the examining of photographic prints or other images or pictures, more especially diaphanous or transparent photographic images, in color or otherwise, such as are used for magic lantern projection and are required or desired to be examined as to their subject matter or quality or for purposes of classification, arrangement and the like. Such picture members, generally referred to as slides, are usually in the form of disks of uniform size, such as two inches square, comprising the image portion, film or plate and usually an adjacent extension bringing it to size.

Instances of this class of instrument or device are shown in the prior patent to Langberg, No. 2,363,427, issued November 21, 1944, and in one aspect the present invention may be considered an improvement thereover, being illustratively shown as applied to the collapsible type of device of said patent; although the novel features of the present invention could be advantageously used in other types of device.

The general object of the present invention is to afford a compact and inexpensive slide viewing instrument by the use of which a succession of slides, meaning any picture carrying members, preferably diaphanous, may be expeditiously examined by the quick insertion and discharge of each slide into and from the instrument and with rapid change from each slide to the next. A further object is to provide in connection with such an instrument an effective slide loading and discharging means or mechanism preferably manually operable. Specifically an object is to provide an arrangement wherein the successive slides or picture disks may be introduced exteriorly by hand, by the aid of a temporary loading adjustment of the parts, and such arrangement or mechanism being self discharging in that each of the slides after examination is dumped from the mechanism to a place of reception whereat the discharged slides may become stacked for convenient occasional removal. Another object is to simplify greatly the manual operation of loading the instrument and render substantially automatic its unloading. Another object is to retain the advantages presented in the viewer of said prior patent whereby an enlarged image is seen, permitting close study, and without the requirement of a special light source or attached lamp, but using daylight or some independent artificial source.

Still another object is to minimize the manual handling of the slides and the danger of causing injury thereto, including impairment of the picture, especially in the case of photographic or color images wherein the emulsion may be vulnerable.

Other and further objects and advantages of the invention will appear in the hereinafter following description of an illustrative embodiment thereof or will be understood by those conversant with the subject. To the attainment of such objects and advantages the present invention comprises the novel slide viewing instrument or device and the novel features of combination, arrangement, mechanism and detail herein illustrated or described.

In the accompanying drawings:

Fig. 3 is a similar perspective view but with the slide supporting panel or carrier in its shifted or tilted position, in readiness for loading, a loose slide being shown about to be inserted into the tilted panel from the rear exterior.

Fig. 4 is a front or interior elevation view of the rear wall of the instrument, with its carried parts, shown in their viewing position, and with the position of a slide indicated at A.

Fig. 5 is a central longitudinal vertical sectional view of the instrument taken on the section line 5—5 of Fig. 4, also showing the parts and slide in viewing position.

Fig. 5a is a partial vertical sectional view like Fig. 5, but with the loading tray shown partially shifted or displaced from viewing position, and other parts correspondingly.

Fig. 6 is a vertical sectional view like Fig. 5, but with the tray shown almost in its extreme or fully tilted position, ready to receive a new slide, and the other parts in the act of discharging the old or previously viewed slide, which is seen in three successive positions B, C and D.

Figures 1, 2:
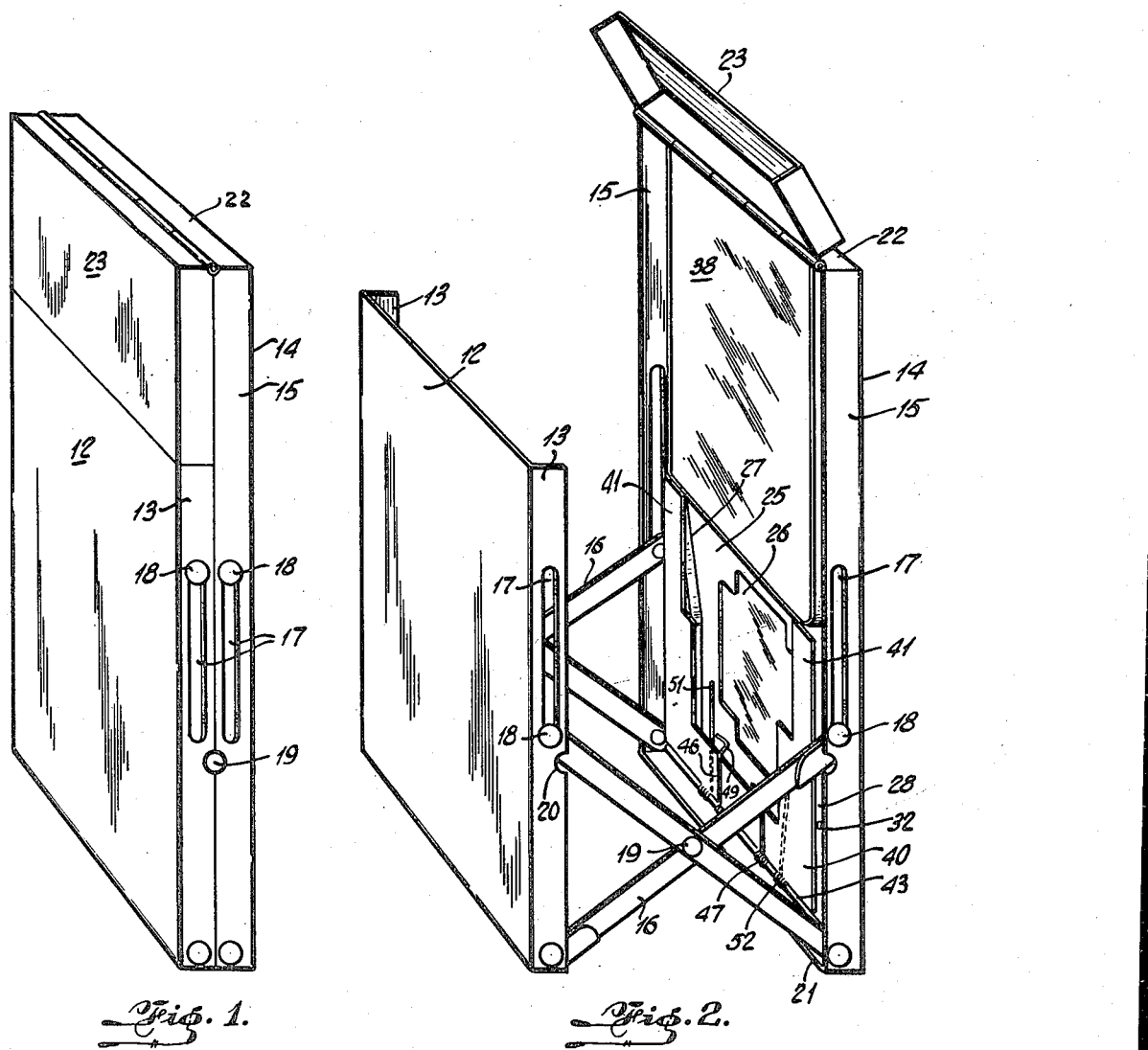
Fig. 1 is a perspective view of a preferred embodiment of the instrument in its collapsed and completely closed position.
Fig. 2 is a similar perspective view but with the instrument longitudinally expanded and fully opened into working or viewing position, but empty and not loaded with a picture slide to be viewed.

In each of Figs. 5, 5a and 6 the parts are seen looking from the righthand side, and the upper portions of the front and rear walls of the instrument are broken away to permit enlarged showing of the lower parts.

Fig. 7, on a smaller scale, and stripped of a number of the working parts, is in the nature of a diagram indicating the manner in which the light may travel from the slide, with reflection by the cooperating front and rear mirrors and passage thence to the observer's eye.

Referring first to Fig. 3, this shows one of the slides 9 in the form of a square disk in position about to be fed or loaded into the instrument; and in the central part of the slide is shown the image plate or picture portion 10, usually oblong in shape, and which may be in the form of a supporting film or glass plate bearing the print or image to be viewed.

After the slide has been loaded into the instrument it passes through successive positions which the drawings indicate as follows. In Figs. 4, 5 and 7 the slide 9 is shown, or its position indicated, in its working or viewing position A, preferably upright. After viewing, each slide passes through a position B which is at an early point in the progress of the slide toward its discharge; and thence it passes through position B' and then C, in the course of ejection, on its way to the final discharged position D, whereat a number of the slides may become stacked, for removal at will.

Coming to the apparatus, there is shown a front wall 12, preferably upright and relatively short, the viewer looking over this wall toward the rear for inspecting the slide. This short front wall 12 has upright flanges or rails 13 at both sides. There is also a rear and considerably taller wall 14, and it similarly has side flanges or rails 15 at the two sides. These front and rear walls, taken with certain side members, may be considered as constituting the frame of the instrument; and while the side frame members might be closed walls, when a boxlike frame is desired, there is illustratively shown at each side a structure permitting collapse of the instrument, consisting of linkage 16 at each side between the front and rear walls, namely a pair of crossing links whose low ends are pivoted to the wall flanges 13 and 15. Each wall flange has a vertical slot 17 for the play of a sliding pivot or pin 18 provided at the upper ends of the links, which are interconnected by a central pivot pin 19. By this arrangement, similar to one of the embodiments in said prior patent, the entire instrument may be flatly collapsed into the condition shown in Fig. 1.

When thus collapsed the instrument may be tightly encased by the front and back walls and their side flanges, also bottom flanges 21 to the two walls and a top flange 22 to the tall rear wall, to which flange may be hinged a shield or hood 23 which when closed by swinging down as in Fig. 1 constitutes a cover completing the enclosure of the instrument.

As a member of the loading and discharging means of the instrument the rear wall 14 is shown as having its central lower portion formed as a shiftable panel 25, preferably exteriorly flush with the remainder of the rear wall and constituting a carrier or upright tray for the successive slides to be examined. The panel 25 is set into an aperture in the rear wall, and in turn it is formed with a central aperture or window containing a diffusing member or ground glass plate 26 when the slides are to be examined by transmitted light. Seen from the interior, the panel or carrier 25 is provided with upright side bars 27, their upper parts being slanted, these operating as guiding and lateral positioning means for each slide positioned at the inner face of the panel in front of the diffuser plate 26. Adjacent to the panel side bars 27 the rear wall carries upright fixed bars 28. The cooperation of these two pairs of bars afford the means of shiftable mounting of the panel in the wall, the shifting being for the purpose of giving exterior access for the manual insertion of successive slides into the panel or carrier. The converging slants of the bars 27 assist the easy loading of the panel, as does the fact that this action is in plain view.

The shifting action of the panel is preferably a tilting action, shown as provided by a pair of opposite pivot pins 29, approximately midway of the height of the panel, each such pin extending at each side through the fixed upright bar 28 and the adjacent bar 27 of the swinging or tilting panel. To complete the positioning of each slide in the carrier panel, the latter is shown as being provided at its inner side with a bottom ledge or bar 30, giving a holding support to each slide fed in between the side bars; and this bottom ledge may be of open construction, and is formed with notches 31 to receive spring fingers 51 arranged to press outwardly upon the lower portion of the panel to keep the panel normally upright and flush with the rear wall as seen in Figs. 2, 4 and 5. When the panel is thus pressed to its upright closed position its swing is stopped by a pin 32 projecting rightwardly from the lower part of the righthand panel bar 27 and entering a notch 33 in the adjacent fixed bar 28. For limiting the opening swing of the panel its left bar 27 at its lower portion is formed with a notch 34 cooperating with a stop pin 42 to be described.

Having referred to the diffuser or ground glass 26, the remainder of the optical elements may conveniently be here explained, with special reference to the diagram of Fig. 7. The beam of light may be considered in successive sections, the section L being indicated as reaching the diffuser from any light source, natural or artificial, as already described. The beam section L passes through the diffuser and thence through the diaphanous portion 10 of the slide 9, emerging as beam section L'. If an opaque print were to be examined the source of light would have to be interior, and the beam section L' produced by reflection. This first interior section or path L' of the light beam passes frontwardly at an upward incline across the space between the front and rear walls of the instrument and strikes and is reflected by a concave mirror 37 mounted at the upper rear side of the front wall 12. From there the beam passes rearwardly with upward incline as shown at $L^2$ to a higher concave mirror 38 mounted at the upper front side of the rear wall 14. From there, again at an upward slant, the path section $L^3$ passes to the eye $L^4$ of the observer. The lines of the diagram may be considered as constituting the axis of the light beam in passing from the picture slide to the eye. In a known manner the combination of the two concave mirrors affords a substantial magnifying effect. The user of the instrument looks conveniently at a downward slant over the top of the front wall 12, between it and the hood 23, and toward the upper mirror 38, and he thereby observes the enlarged image of the picture slide, by reason of the cooperation of the inwardly facing mirrors. The view is at an appreciable angle to the normal, but insufficiently so to disturb seriously the inspection; but if desired, the slide in its viewing position could be given a suitable slant to render the viewing angle more nearly normal. In the preferred arrangement the slide-carrying panel is arranged below and in substantially the same plane with the rear mirror 38.

The mechanism for manipulating the manually infed slides comprises the shiftable or tilting carrier panel 25 and in cooperation with it certain other mechanical elements including a member 40 which takes part in the movements of each slide between loading and discharging points, and being an oscillating member with quick movements, like the fly in a printing press, may conveniently be designated as a fly. This fly 40 is of the character of a light swinging wall, cut out centrally to U-shape to clear the path of the light, and serving when in working position to enclose the margins of the space on the panel wherein the slide is accommodated. This fly may swing about a low horizontal axis from and to its working position in each cycle of the action. It is shaped, as best seen in Figs. 2 and 5, with a horizontal or body portion and upstanding wings 41 at the right and left sides; and on the left wing is provided a stop pin 42 which cooperates with the stop notch 34 formed in the lower left portion of the panel as already described, the cooperation of these limiting the swinging displacement or opening movement of the panel. The mounting of the swinging fly is shown as comprising an axle 43, which constitutes a rock-axle in that the fly is fast upon it, the axle turning in bearings 44 on the rear wall.

Certain spring elements are employed to give resilient control to the movements of the tilting panel 25 and the swinging fly 40. Thus, to press the fly swingingly up and rearward toward its normal position there is provided a pair of spring fingers 46, lying closely in front of the body of the fly, such fingers being shown as formed by extensions of spring coils 47 mounted for convenience loosely upon the axle 43, each spring coil having a tail 48 bearing against the rear wall to maintain the spring under tension or stress. The upper end of each of the spring fingers 46 is shown as being bent rearwardly over the top edge of the fly body, forming a pair of protruding humps or guards taking part in the manipulation of the slides, namely, by bearing lightly on the lower margin of each slide and holding it in its proper plane during viewing.

The fly has an advantageous function in that its wings cover the cracks between each fixed bar 28 and adjacent panel bar 27 thus excluding light that might disturb the viewer.

There is also shown a pair of spring fingers 51 having certain functions including the resilient holding of the panel in its closed or working position, these spring fingers being arranged to enter the notches 31 formed in the bottom ledge 30 of the panel. Not only do these springs press lightly forward on the swinging lower part of the panel but normally they bear also against the inserted slide carried by the panel, holding it snugly in its proper plane against the wall of the panel. However, when the panel is forcibly swung to its loading position, for example by the pressure of the thumb, as shown in Fig. 6, this panel displacement operates to push frontwardly the springs 51 causing them to yield extensively, until the springs eventually become inoperative because overridden by the lower edge of the panel as it comes to its loading position, with the stop pin 42 on the fly engaging the stop notch 34 on the panel and thus limiting the swinging movement of the latter. When the panel is manually restored toward working position this again releases the spring fingers 51 which then resume their normal position, bearing lightly upon and thus holding in place the newly infed slide. The spring fingers 51 are shown constituted of extensions of coil springs 52, loosely surrounding the axle 43, with extension tails 53 to maintain working stress in the springs. The spring fingers 51 are sufficiently long, as seen in Figs. 5ª and 6 that they never become overridden by the lower edge of the outer or front wall of the panel 25; wherefore the fingers can not snap up beyond or in front of the panel and become inoperative.

Another feature, which cooperates with the spring fingers 51 in the interior discharging of each slide from the panel, is a transverse recess 55 in the panel wall just above the bottom ledge 30. It is gouged out of the panel, forming an undercut below the overhanging shoulder 56 thereby formed. This recess or undercut 55 accommodates the bottom edge of each slide at the start of its inswinging discharge from the panel. As already described, and seen in Fig. 5ª, as the opening tilt of the panel begins, the panel lower edge bends frontwardly or inwardly the spring fingers 51 resting in the ledge notches 31. The fingers thus swing inwardly and down, while bearing upon the lower edge of the slide. This causes the inward tilting of the slide because the spring pressure thrusts the slide lower edge rearwardly into the panel undercut or recess 55, while the shoulder acts as a fulcrum, as seen in Fig. 5ª, tilting the slide leftwardly in that figure, that is, inwardly and away from the panel which is in the act of tilting the other way; the shoulder being shown rounded and the slide and fingers in effect rolling around the shoulder as they tilt inwardly. The slide therefore is positively prevented from returning to loading position with the panel but on the contrary is started on its ejecting motion as will be further described.

The elements of the instrument having been described a general summary of the novel characteristics may conveniently be here set forth. The instrument has a general frame, shown as comprising walls, the frame or walls giving support to suitable optical means, such as the illustrated mirrors, for viewing the slides loaded into the instrument, to this extent the recital conforming also with the disclosure of said prior Patent No. 2,363,427. An important difference thereover however is that in the present instrument, at one wall or frame part, is movably fitted a panel for carrying the successive slides to be viewed and which is shiftable, specifically in a tilting manner, between the normal closed or viewing position of the panel and a displaced or open loading position, in the latter of which each slide can be exteriorly inserted or loaded into the panel thereby to be brought to normal position for the viewing thereof. This plan of construction and operation attains important features of advantage as already recited; but preferably such mode of loading and positioning the slides for viewing is supplemented or complemented by means taking part in the independent discharging of each slide from the panel in a way to clear the panel for receiving another slide. In its preferred form the discharging means is wholly interior, within the instrument, and is actuated by the movements of the panel in shifting it from viewing to loading position and restoring it to viewing position. Such interior means thereby operates to discharge each slide from the panel in advance of the succeeding slide coming into the viewing position.

By the conception thus described the instrument is readily operable, with the greatest of ease in loading it, and without the need of any attention whatever to the unloading or discharging of successive slides, which may be allowed to accumulate either within the bottom of the instrument or adjacently thereto, to be removed occasionally or at convenient intervals in the form of a stack. In the prior patent every slide had to be handled, and with some difficulty, both for inserting or loading it into the instrument and for removing it therefrom, in that specific case the instrument having to be picked up from the table and the change of slides made underneath. The present instrument may remain on the table, the successive slides having merely to be manually inserted into the open carrier or panel, the panel being closed for viewing the slide, and the similar actions on the next slide automatically effecting the discharge of the previous one. This not merely saves time and trouble but minimizes the possibility of injury, since some slides are subject to impairment by finger marks on the emulsions thereof. With the present invention numerous slides can be successively handled practically without need of fingering the image portion thereof, either in loading or discharging. The loading is considerably assisted by the tapering formation of the enclosing side bars 27 of the panel, which serve to guide easily the slide into position even though the user must reach around from him behind the instrument for the purpose; and moreover the loading action as described is further facilitated by the fact that the slide can be seen, either by way of the mirrors, or directly by looking downwardly above the front wall, giving assurance that each slide properly reaches the viewing position in the panel.

The mode of operation may be reviewed as follows. The instrument is opened by expanding its pantograph or lazytongs linkage and then set up on the table. The panel is normally in closed viewing position as in Figs. 2, 4, 5 and 7. Manually, as by finger pressure thrusting inward its lower rear face, the panel is displaced to loading position, its upper portion swinging outwardly; Fig. 5ᵃ showing the start of the opening movement; Fig. 3 showing it almost finished, just enough short thereof to show the relation of stop pin 42 and notch 34; and Fig. 6 showing the motion completed. The panel rests there because its tilt has rendered inoperative the panel springs 51 and fly springs 46. Now the slide is inserted by a natural action as in Fig. 3, and dropped into place in the panel at the back, under observation from the front. The two panel bars 27 and ledge 30 constitute gages for positioning the slide. The slide need be handled only by its extending margins, protecting its image portion. The panel is next restored by thrusting inward its upper rear portion, and it snaps into viewing position by the springs 51, aided by the springs 46, each of which may bear on the slide margin to hold it firmly in viewing position A. Examination of the print is then made at leisure, by transmitted or reflected light, the instrument being bodily movable into optimum location as desired.

These actions are repeated, as a cycle, for the next succeeding slide, and during the opening and closing panel movements the preceding slide is disposed of as follows, to be received upon the table or an instrument floor or receptacle forming a removable stack, all without handling. The panel opening movement carries the discharging parts through successive positions as shown, the slide passing through positions A, B, B', C and D. At the start, Fig. 5ᵃ, the fly 40 is thrust away by the inward swing of the lower part of the panel; and the spring fingers 51 also are swung away, their resisting pressure forcing the slide lower edge into the panel wall recess 55, so that the slide has tilted away to position B, supported by the springs 51 and the panel ledge 30. Continuing, the further panel swing causes the fly to swing to its furthest position, as in Figs. 3 and 6, the slide swinging inwardly further to position B'. From there the slide continues to swing in and down, between the wings of the fly, through position C and finally to stacking position D. If the rear edge of the slide should remain cocked up by a part of the fly, this would be corrected, after the succeeding slide has been loaded, by the restoring of the parts again to viewing position, wherein the fly returns to upright, releasing the discharged slide.

There has thus been described an illustrative embodiment of the invention hereof; but as many matters of combination, arrangement, mechanism and detail may be variously modified without departing from the principles of the invention it is not intended to limit the invention to such matters except to the extent recited in the respective claims.

What is claimed is:

1. A slide viewing instrument having upstanding frame walls including back and front walls defining an interior space and supported by said walls inwardly facing lower front and higher back mirrors for viewing from outside the instrument image slides loaded into the instrument, the back wall being formed with a substantial aperture below said back mirror; and arranged on the back wall of the instrument and adapted to occupy said aperture a normally upright slide-carrying panel adapted to support each slide flatwise upon the panel and having pivot means mounting the panel upon the back wall to swing or tilt about a horizontal axis between a normal closed upright or viewing position of the panel and an inclined or open loading position in which latter position its upper edge projects outwardly beyond the back wall, whereby at such loading position each slide can readily be exteriorly inserted and loaded upon the panel to be thereupon swung with the panel to normal closed or upright viewing position; and interior discharge means comprising mechanism operable by the swinging of the panel to cause discharge of each viewed slide interiorly from the panel in advance of the succeeding loaded slide coming into viewing position by the return of the panel to upright position.

2. A slide viewing instrument having substantially upright back and front walls defining an interior space and supported in substantially upright positions by said back and front walls respectively inwardly facing higher and lower mirrors for viewing from the exterior front of the instrument image slides loaded into the instrument, the rear wall below its mirror being formed with a substantial panel aperture; and arranged on said rear wall of the instrument and adapted to occupy said aperture a normally upright slide-carrying panel adapted to support each slide flatwise upon the panel and having pivot means mounting the panel upon the back wall to swing about a horizontal axis between an upright viewing position and an inclined loading position of the panel in which latter position its upper edge projects outwardly beyond the apertured wall, whereby at such loading position a slide can readily be exteriorly inserted and loaded upon the panel to be thereupon swung with the panel to upright viewing position; and interior discharge means comprising mechanism operable by the swinging movement of the panel to cause discharge of each viewed slide interiorly from the panel; the aforesaid panel pivot means being located at a height about midway of the panel top and bottom, whereby when the top swings out the bottom swings in; and wherein such inswinging movement acts through said discharge mechanism thereby bringing about such discharge of each slide after viewing the same.

3. An instrument as in claim 2 and wherein are stops arranged to limit the panel swinging movements between upright and inclined positions; and a spring adapted to exert pressure upon the panel to restore and hold it in upright viewing position; said spring being arranged so that the swinging of the panel to full inclined loading position operates to thrust the spring to a temporary inoperative position, whereby the panel can remain in its loading position until returned at will toward viewing position whereupon the spring becomes again operative to press the panel toward viewing position.

4. An instrument as in claim 2 and wherein the discharge means is operative to cause the discharge of each viewed slide from the panel to an interior bottom position whereat the viewed slides become self-stacked.

5. A slide viewing instrument having upstanding frame walls including back and front walls defining an interior space and supported by said walls inwardly facing front and back mirrors for viewing from outside the instrument image slides loaded into the instrument, the back mirror being elevated and the back wall being formed with a substantial aperture below said back mirror; and arranged on the back wall of the instrument and adapted to occupy said aperture a normally upright slide-carrying panel adapted to support each slide flatwise upon the panel and having pivot means mounting the panel upon the back wall to swing or tilt about a horizontal axis between a normal closed upright or viewing position of the panel and an inclined or open loading position in which latter position its upper edge projects outwardly beyond the back wall, whereby at such loading position each slide can readily be exteriorly inserted and loaded upon the panel to be thereupon swung with the panel to normal closed or upright viewing position; and means on the panel for gaging the position of each slide thereon; and the panel having at its interior side a horizontal low shoulder forming a horizontal undercut recess beneath such shoulder, such recess being adapted to receive the lower edge of the slide in a manner to produce inward tilting of the slide about said shoulder for cooperating in the ejection of the slide from the panel.

6. An instrument as in claim 5 and wherein is provided also a fly member swingably mounted on the frame near the foot of said front wall to oscillate between an upright position adjacent to the inner face of the panel and an inwardly and downwardly swung position, said fly member being provided with a spring located to press the fly member toward the panel.

7. An instrument as in claim 5 and wherein is provided also a fly member swingably mounted on the frame near the foot of said front wall to oscillate between an upright position adjacent to the inner face of the panel and an inwardly and downwardly swung position, said fly member being provided with a spring located to press the fly member toward the panel; said fly member having a body portion at its lower end, and upstanding wings, and carrying a stop means located to limit the swinging of the panel into its loading position.

CHARLES LANGBERG.

REFERENCES CITED

The following references are of record in the file of this patent:

UNITED STATES PATENTS

| Number | Name | Date |
| --- | --- | --- |
| 1,018,439 | Newman | Feb. 27, 1912 |
| 1,900,557 | Holcombe | Mar. 7, 1933 |
| 670,752 | Wyatt | Mar. 26, 1901 |